R. SCHNEIDER.
STEAM CONDENSING AND FEED WATER HEATING PLANT.
APPLICATION FILED JAN. 13, 1908.
12,868. Reissued Oct. 20, 1908.
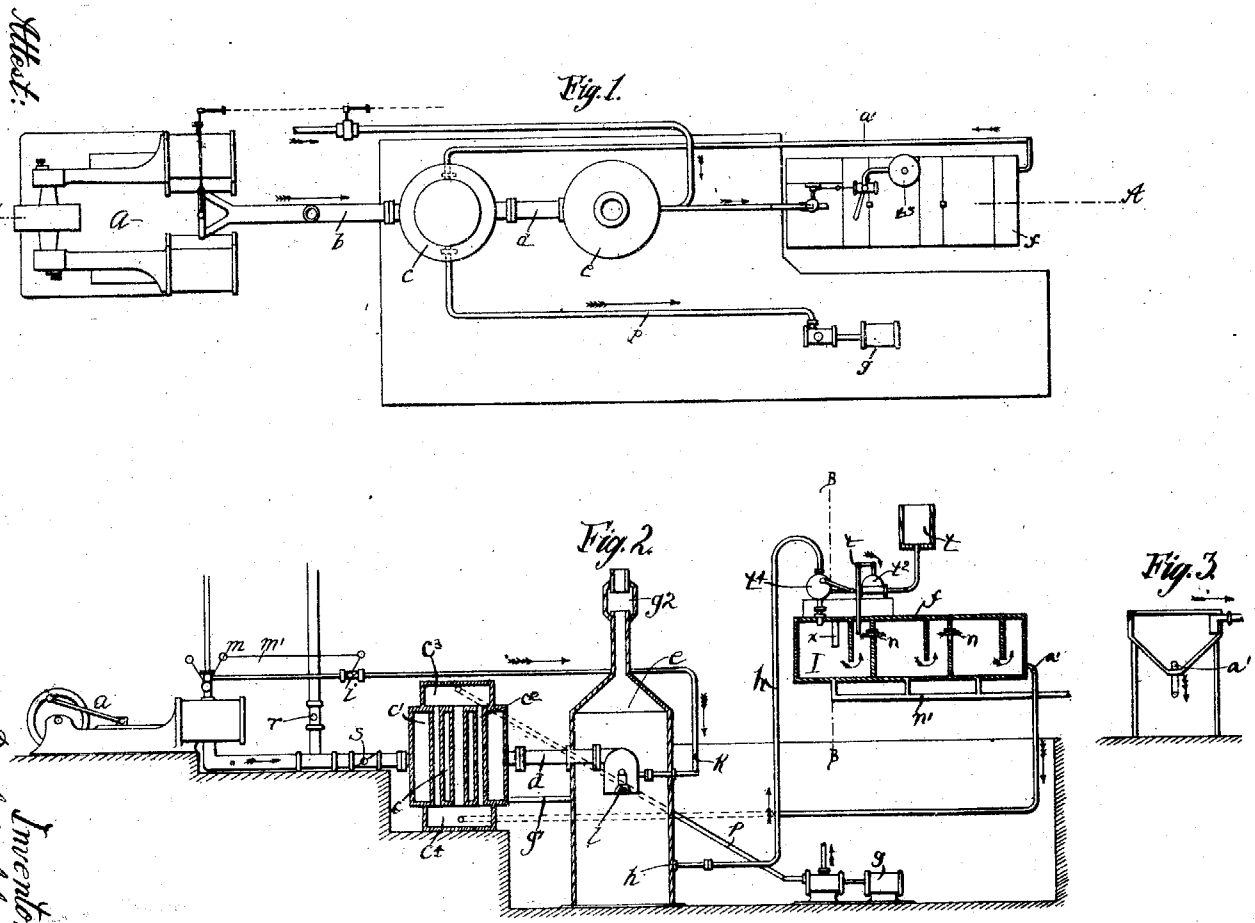
Attest:
Benton A. Stall.
Edward N. Sarton
Inventor:
Reinhold Schneider
By Spear, Middleton, Donaldson & Spear
Att'ys.
NORRIS PETERS, INC., LITHO., WASHINGTON, D. C.

UNITED STATES PATENT OFFICE.

REINHOLD SCHNEIDER, OF SHARON, PENNSYLVANIA.

STEAM-CONDENSING AND FEED-WATER-HEATING PLANT.

No. 12,868. Specification of Reissued Letters Patent. Reissued Oct. 20, 1908.

Original No. 806,368, dated December 5, 1905, Serial No. 235,096. Application for reissue filed January 13, 1908. Serial No. 410,699.

*To all whom it may concern:*

Be it known that I, REINHOLD SCHNEIDER, a citizen of the United States, residing at Sharon, Pennsylvania, have invented certain new and useful Improvements in Steam-Condensing and Feed-Water-Heating Plants, of which the following is a specification.

The present invention relates to a steam-condensing and feed-water heating and purifying plant designed more especially for use in connection with engines which operate intermittently or in which there is great variation in the load at frequent intervals, though capable of use with advantageous results in connection with any stationary engine.

Among the objects had in view in devising the present invention are the following: First, to take care of or better to condense great volumes of engine exhaust-steam at any and all times without waste of cooling water and without reducing the temperature of the already heated feed water: second, to avoid the feed water being carried away by the exhaust steam (on account of high pressure) in the condenser: third, to store away the heated surplus feed water while the engine or engines are running at high speed or full capacity, so that no cold water needs to be fed while engines connected to the heater or some of them are idle and others not connected to heater are running: fourth to reduce as much as possible the back pressure in the engine exhaust connected to heater, fifth, to utilize the unavoidable back pressure for forcing the feed water to a sufficient height to avoid the objectionable raising of the heater or lowering of feed water pump, which otherwise is necessary in order to have the hot water flow by gravity into feed water pump; sixth, to remove as far as possible all objectionable mineral matter contained in the water before it enters the boiler and before going through the second and final stage of heating and at such time when the water is sufficiently heated up as will insure a thorough effect of the agent to be used for precipitating the objectionable impurities in the feed water, and to do this in an open reservoir from which the sediments, oil, and other impurities may readily be removed: seventh, to run the exhaust steam and feed water in opposite direction, so that the hottest exhaust steam passes first the hottest feed water and after this meets the colder spray water: eighth, to hold the exhaust steam in the preliminary condenser as long and in as great a quantity as practicably possible, however, without increasing the back pressure of the engine, this in order to take in the condenser as much heat as possible from the exhaust steam, in which case both the pressure in the secondary condenser or heater and loss of heat by the escape of steam therefrom will be the lowest possible, while at the same time the difference in temperature between the engine cylinder on the one side and exhaust pipe $b$ and heater $c'$ on the other side is as small as possible, so as to keep the condensation in the engine cylinder caused by the fall in pressure of the steam in the exhaust pipe down to a minimum, ninth, to furnish the water purifying material to the water in proper proportion to amount of water and the determined impurities therein.

With these and other objects in view the invention includes the combination and arrangement of parts hereinafter described and particularly pointed out in the claims.

The invention is illustrated in the accompanying drawings in which:—

Figure 1 is a plain view. Fig. 2, a vertical section along line A A of Fig. 1. Fig. 3 is a partial section on line B B, these figures being of a diagrammatic nature, as the invention resides in the combination of devices and general arrangement whereby the parts coöperate to secure the objects aforesaid and not in the special construction of any of the particular devices entering into the combination.

Referring by reference characters to the figures the letter $a$ designates an engine the steam of which is to be condensed, and $b$ the exhaust therefrom connecting with a preliminary condenser $c$, which also forms a secondary feed water heater. This consists of a steam chamber $c'$ having transverse tubes $c^2$ through the same connecting the water compartments $c^3$ and $c^4$, to which the water flow and return pipes are connected, as hereinafter described. The exhaust pipe $b$ connects with one side of the chamber $c$, and the uncondensed steam is conveyed away on the opposite side by the pipe $d$. The exhaust steam entering heater $c$ at the left loses part of its heat to the water circulating through the tubes $c^2$, and part of the steam is condensed due to the fall in pressure caused by the great cubical content and great cooling area of heater, $c$. The rest leaves heater $c$ by pipe $d$ and enters the open heater $e$, where it comes in contact with a water spray from pipe $k$ and is thereby further condensed and heats thus the spray water. The spray water collecting in the bottom of heater $e$ is forced into the compartment I of an elevated reservoir $f$ (hereinafter described) by the pressure existing in heater $e$ due to the remaining exhaust steam. The mixture of heated water and condensed steam may thus be lifted to any desired height according to the pressure allowed in the heater $e$. In this way the water may be lifted easily up to ten feet without adding to the back pressure of the engine, gaining thereby a difference of height in the level of the water in heater $e$ and reservoir $f$. This difference can be so selected that the water will flow by gravity from reservoir $f$ into preliminary condenser $c$ and from there into the boiler feed pump $g$ without the floor or boiler feed pump being lowered below the floor of feed water heater $e$ to such an extent that the heated water would flow under a certain pressure into the suction end of the boiler feed pump, so as to avoid the hot water from forming steam under the partial vacuum caused by the suction action of boiler feed pump. Besides, what is equally important, there is no heated water lost through the overflow as is the case in all present applications of feed water heaters, because the water will rise and overflow into $f$ as soon as it rises over the outlet $h$, leading to the storage reservoir $f$, and the pressure in condenser $e$ is sufficient to force it to that required height. Thus the unavoidable pressure in condenser $e$ is utilized for lifting the heated water, whereas in arrangements now in use the existing pressure in $e$ forces the heated water out through the overflow and the hot water goes to loss, while cold water takes its place. The cold feed water is fed to condenser $e$ through valve $i$, from where it runs through pipe $k$ to sprayer $l$.

It will be readily seen that when an engine is running intermittently or under widely varving loads, as in rolling mill engines, there will be wide and sudden variations in the quantities of steam entering the condenser. For instance, if the engine is of one hundred horse power and is running for a short period under full load a large amount of exhaust steam will be supplied to the condenser, and if the water spray is sufficient to take care of this then when the load suddenly lightens and the exhaust steam is materially reduced or entirely stopped then cold water will be sprayed in in excess, unnecessarily cooling off the feed water already in the heater. Now in order to prevent this and to feed only hot water to reservoir $f$, the valve $i$ is automatically controlled or regulated according to the movements made by the steam throttle valve indicated at $m$. This may be done by any suitable connection, those indicated diagrammatically at $m'$ being a representation of any mechanical or electrical connections by which the throttle valve and spray valve will operate in unison. By this arrangement cold water is only then fed to the heater when exhaust steam passes through condensers or heaters $c$ and $e$, thus avoiding any accumulation of cold water in $e$, which in case water was constantly fed would be forced into $f$ as soon as exhaust steam of sufficient pressure would enter $e$. Now this cold water entering $f$ would in the first place not be fit to be treated by boiler compounds, and secondly, the following hot water would have to flow over from $f$, since while there was no exhaust steam coming from the engine the engine certainly was not running, therefore no steam was used, and in consequence no feeding or hardly any, to the boilers was required, but yet the valve $i$ would keep on feeding cold water and keep any heater arrangement filled up to the overflow line and so leave no room for the hot water, which would follow as soon as the engine would start to run and furnish exhaust steam for heating. In reservoir $f$ the heated water coming from condenser or heater $e$ is led through a series of compartments in order to precipitate the detrimental mineral matter as well as separating all oil etc. To attain this end thoroughly, the water cleaning material is added to the hot water in compartment I in proper proportion to the amount of water fed through I. The cleaning material may be pumped into compartment I in a liquid form by a pipe, (indicated at $t'$) being fed through a pump $t^2$ from tank $t^3$ as shown in drawings, or lifted up and thrown in there by means of belt, bucket or the like conveyer. Conveyer or pump are intended to be automatically regulated to suit the flow of water. This may be done by using the flow of the water passing through $h$ to rotate a turbine or water wheel $t^4$, which in turn may actuate pump $t^2$, as indicated in the drawings. It is also intended to have an agitating device in compartment I in order to have the water thoroughly mixed with the cleaning material. Steam or air may be employed for this purpose, such as indicated at $x$ in Fig. 2. In Fig. 2 the reservoir is shown as divided in three compartments; but any number may be used, each compartment having a partition wall reaching down near to the bottom, whereby the water has to pass under each partition and through pipes $n$ into the next compartment, being thus gradually freed from oil, etc., which from this upper reservoir may easily be removed. The sediment resulting from the precipitated matter may be drawn off from the different compartments through properly located drain $n'$. The capacity of the reservoir should be such that sufficient hot water may be stored to furnish hot and purified water to boilers to run such engines and machines not connected with the exhausts to heating plant, while engines running intermittent are idle and whose exhaust is used for heating the boiler feed.

Reservoir $f$ has an overflow and outlet $a'$ which leads the heated and purified water and condensed exhaust steam to heater $c$, the water entering at the bottom and leaving at the top, and feeding thus the boiler feed pump $g$ through pipe $p$. The feed water entering chamber $c$ passes through tubes $c^2$ upward and is heated a second time by the exhaust steam coming from engine and passing around and in contact with tubes $c^2$. The exhaust steam condensing in chamber $c$ is drained into the secondary condenser $e$ through pipe $g'$, and from these the spray water and condensed steam pass into reservoir $f$, as before described, where the oil is separated and the rest used as feed water.

The heater $e$ may have a head $g^2$ for catching condensed water. The exhaust pipe $b$ may have a branch exhaust and valves $r$ and $s$, by means of which the water heating plant may be cut out and the engine would exhaust direct into the atmosphere when found necessary.

Having thus described my invention, what I claim is:

1. In a steam condensing and feed water heating system, the combination of a condenser connected to receive exhaust steam therefrom, a water supply having means for spraying water into the steam within said condenser, a valve controlling said water supply, a device for controlling the passage of steam to the engine cylinder and connections between said device and the valve in the water supply pipe, whereby they are operated in unison and the amount of water sprayed into contact with the steam be maintained proportionate to the quantity of exhaust steam and passing into the condenser.

2. In a steam condensing and feed water heating system, the combination with the engine, of a condenser connected to receive the exhaust steam therefrom, a water supply to said condenser, a valve controlling said water supply, and automatically operating connections from said valve to the throttle valve of the engine whereby the former valve is moved in unison with the latter, substantially as described.

3. In combination, a steam engine, a surface condenser 2 or steam injected condenser receiving exhaust steam from said surface condenser, a storage tank located at a higher elevation than the surface condenser and receiving the feed water from the lower part of the said second condenser, a pipe connection from the storage tank to the surface condenser, and a boiler feed pump connected to the surface condenser, said surface condenser being located at an elevation intermediate of that of the storage tank and of the feed pump, substantially as described.

4. In a steam condensing and feed water heating plant, the combination with the engine of a steam injected condenser or heater receiving exhaust steam therefrom, means for spraying water into the condenser in quantities corresponding to the steam coming from the engine, a storage tank connected with the condenser, and means for feeding water purifying material into said storage tank in quantities varying according to the flow of water into the same, substantially as described.

In testimony whereof I affix my signature in presence of two witnesses.

REINHOLD SCHNEIDER.

Witnesses:

M. A. Tozier,

Edward N. Sarton.